William R. Puckett
Thomas R. Loder
Travis J. Hagler
Robert Bennett
Samuel Zeman

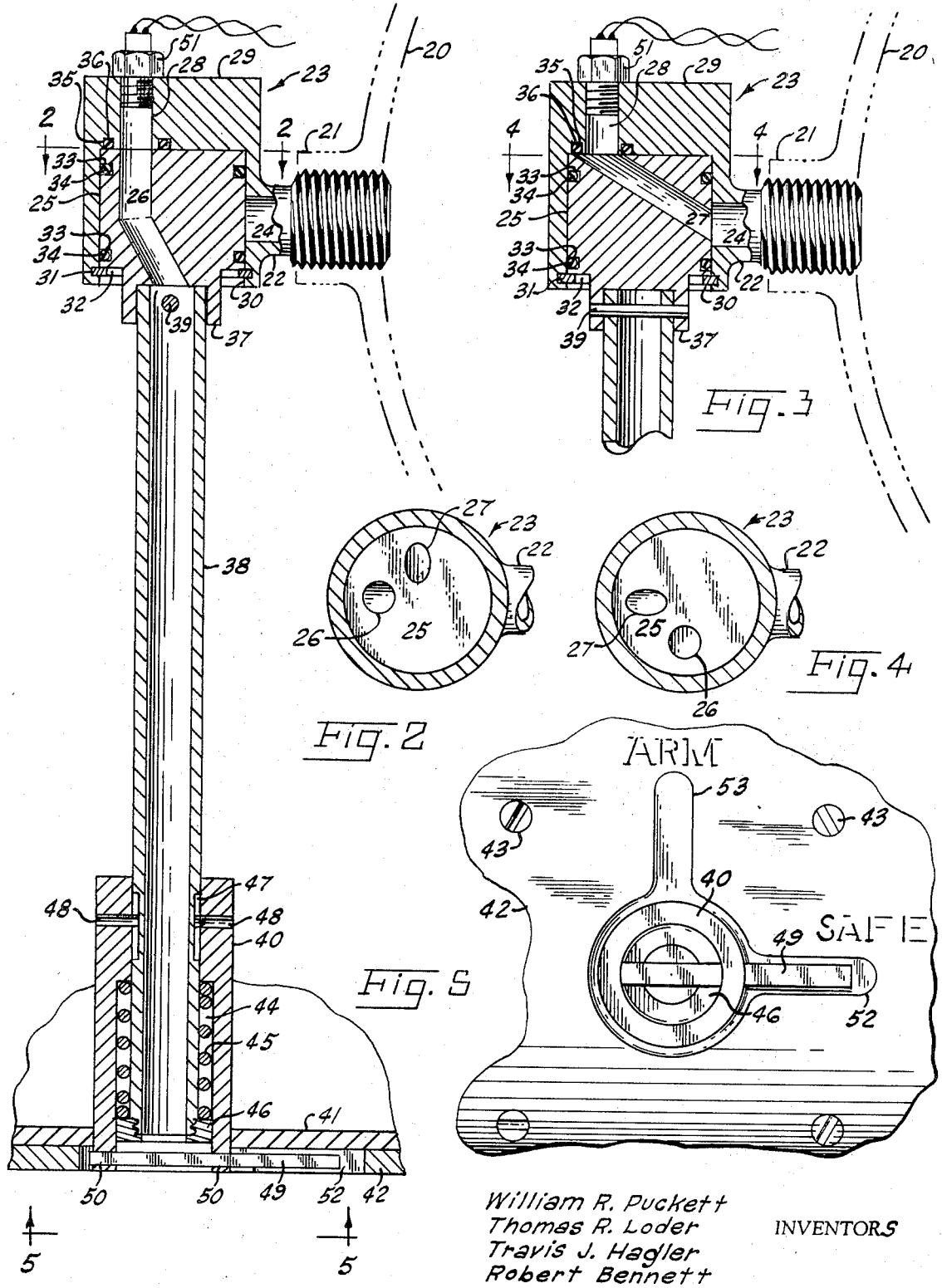

INVENTORS

BY *Rott Williams* ATTORNEY

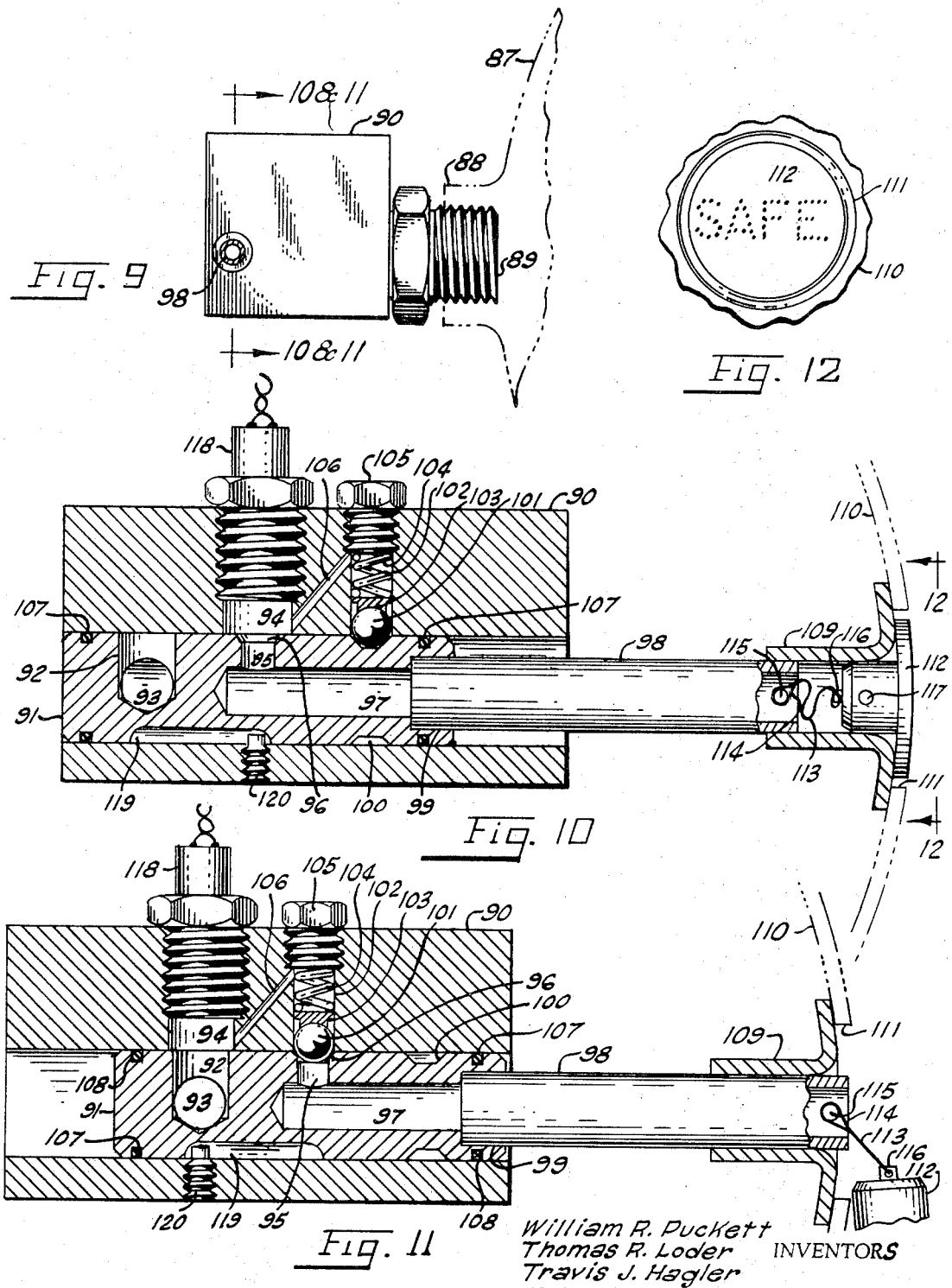

3,529,418
SAFE-ARM DEVICE FOR SOLID PROPELLANT
ROCKET MOTORS
William R. Puckett, Trinity, and Thomas R. Loder, Huntsville, Ala., Travis J. Hagler and Robert Bennett, Levittown, Pa., and Samuel Zeman, Huntsville, Ala., assignors to Thiokol Chemical Corporation, Bristol, Pa., a corporation of Delaware
Filed June 21, 1968, Ser. No. 739,019
Int. Cl. F02k 9/04
U.S. Cl. 60—39.09                                              6 Claims

ABSTRACT OF THE DISCLOSURE

A safe-arm device including a body that is to be connected to a rocket motor case and having therein a movable plug that in one position will prevent accidental or inadvertent ignition of a solid propellant grain in the rocket motor case and will, when moved to another position, permit command ignition of the solid propellant grain.

BACKGROUND OF THE INVENTION

Field of the invention

One of the biggest problems confronting the rocket industry is the prevention of accidental or inadvertent ignition of the solid propellant grain in a rocket motor case for a solid propellant rocket motor during the handling or storage of the solid propellant rocket motor.

The embodiments of the instant invention provide simple, inexpensive safe-arm devices that will prevent the accident or inadvertent ignition of a solid propellant grain and are susceptible to manual adjustment without the need of an operating mechanism of any type.

Description of the prior art

There are many types of safe-arm devices that have been developed, but in most instances such devices require operating mechanisms, are expensive and are of a size that requires considerable space in which they may be positioned to successfully carryout their necessary operational requirements.

The simple construction and mode of operation of the instant invention is believed to be a considerable advance over prior safe-arm devices that are in use at the present time.

SUMMARY OF THE INVENTION

This invention, therefore, relates to improvements in safe-arm devices and more particularly to safe-arm devices of a type that are simple in construction, inexpensive to manufacture, susceptible of manual operation and are particularly directed to the prevention of accidental or inadvertent ignition of a solid propellant grain that has been incorporated into the rocket motor case of a solid propellant rocket motor.

The ignition systems for solid propellant rocket motors usually include an igniter or squib which upon the actuation thereof will ignite a pyrotechnic composition which will subsequently ignite the solid propellant grain in a rocket motor case. It is the accidental or inadvertent actuation of the igniter or squib which the instant invention seeks to prevent.

Static electricity is one of the greatest causes for the accidental or inadvertent actuation of the igniter or squib and the prevent invention does not overcome such actuation, but by the peculiar arrangement of the various elements of the safe-arm devices prevents such atuation of the igniter or squib from igniting the pyrotechnic material by diverting any flames or gases created by the igniter or squib away from the pyrotechnic material to be vented to the atmosphere when in the safe position.

In the arm position into which the device may be manually moved after the solid propellant rocket motor has been placed in a conventional launching installation, the igniter or squib is capable of igniting the pyrotechnic material with subsequent firing of the solid propellant grain in the rocket motor case.

It is an object of the invention, therefore, to provide efficient, simple and inexpensive safe-arm devices that will prevent accidental or inadvertent ignition of the solid propellant grain in the rocket motor case of a solid propellant rocket motor.

With the above and other objects and advantages in view that may appear to one skilled in the art, it will be clearly understood that the invention will consist of the special arrangement of parts as will be later described and illustrated in the accompanying drawings in which:

BRIEF DESCRIPTION OF THE DRAWINGS

FIG. 1 is a longitudinal sectional view, partly in elevation, of one form of the embodiment of the invention in safe position;

FIG. 2 is a cross sectional view taken on the line 2—2 of FIG. 1;

FIG. 3 is a fragmentary sectional view, partly in elevation, of the form shown in FIG. 1 in arm position;

FIG. 4 is a cross sectional view taken on the line 4—4 of FIG. 3;

FIG. 5 is a fragmentary elevational view taken on the line 5—5 of FIG. 1, showing a portion of the air frame for a solid propellant rocket motor;

FIG. 9 is an end view, partly in section, of another embodiment of the invention;

FIG. 10 is an enlarged longitudinal sectional view taken on the line 10—10 of FIG. 9 and showing the form of the invention shown in FIG. 9 in safe position;

FIG. 11 is a view similar to FIG. 10 taken on the line 11—11 of FIG. 9 and showing the form of the invention shown in FIG. 9 in arm position; and FIG. 12 is a fragmentary elevational view taken on the line 12—12 of FIG. 10.

DESCRIPTION OF THE PREFERRED EMBODIMENTS

Figure 6:
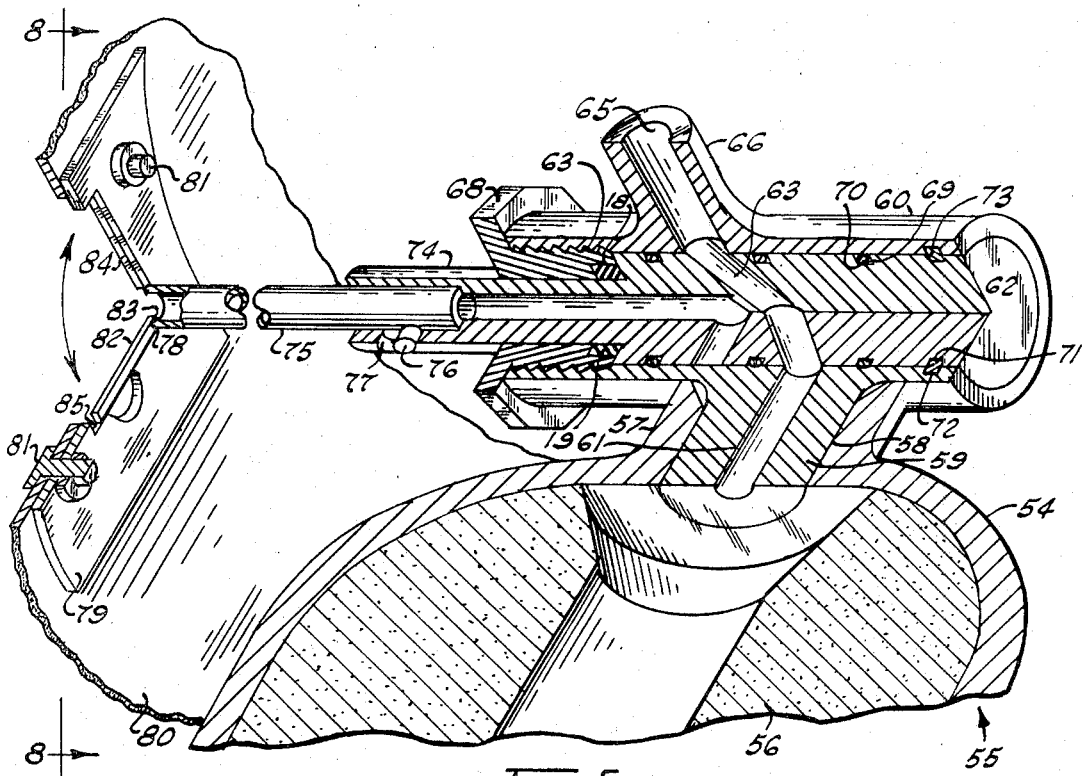
FIG. 6 is a detailed longitudinal sectional view, partly in elevation of another form of the embodiment of the invention in arm position.

Referring more in detail to the drawings and more especially to FIGS. 1 to 5 inclusive thereof, wherein like parts are designated by like reference numerals, the reference numeral 20 is used to designate in dotted lines the domed head end of a rocket motor case for a solid propellant rocket motor. As shown, the head end 20 has an internally threaded central flanged opening 21 into which is threaded an externally threaded boss 22 which is integral with and extends at right angles from a circular housing 23 and is provided with a bore 24.

Mounted for rotational movement within the housing 23 is a circular plug 25 that is provided with passageways 26 and 27 respectively, that are adapted to alternately register with a port 28 that is located in a closed end 29 of the housing 23.

The housing 23 is provided with an open end 30 which is of a size to receive the plug 25 and positioned inwardly of the open end 30, but adjacent thereto within the housing 23 is an annular groove 31 that receives therein a retainer ring 32 that maintains the plug 25 within the housing 23. The circumferential surface of the plug 23 is provided with a pair of annular grooves 33 in which are received O-rings 34 which seal the plug 25 within the housing 23. An annular groove 35 having an O-ring 36 therein, is provided in the interior of the housing 23 in circumjacent relation to the port 28 and the O-ring 36 seals the port 28 with relation to the plug 25.

The plug 25 on the outer end thereof is provided with a socket 37 that extends outwardly of the housing 23 through the open end 30 thereof, and one end of a tubular member 38 is rigidly secured in the socket 37 by a dowel or pin 39.

The opposite end of the tubular member 38 extends into a cylindrical collar 40 which is secured at its outer end to a backup or reinforcing plate 41 and the plate 41 is in turn secured to the air frame 42 of the solid propellant rocket motor by fastening means 43.

The collar 40 is provided with an enlarged bore 44 in which is positioned a tensioning spring 45 and tension is applied to the spring 45 by an internally threaded retainer ring 46 which is threaded onto the extreme end of the member 38 and is received within the bore 44 of the collar 40. A portion of the member 38 within the bore 44 of the collar 40 is provided with an annular recess 47 and diametrically opposed radially deposed retaining pins 48 mounted in the collar 40 extend inwardly thereof, so that the inner ends of the pins 48 are received in the recess 47.

The outer end of the collar 40 extends through the backup or reinforcing plate 41 so that it is flush with the outer surface of the airframe 42 and a rectangular-shaped rod 49 extends through alined openings 50 in the outer end of the collar 40 at right angles to the longitudinal axis of the collar 40 as shown in FIG. 1.

In the operation of this form of the invention a conventional igniter or squib 51 is threaded into the outer end of the port 28 after the body 23 has been secured to the head end 20 of the rocket motor case by means of the boss 22, as previously described.

It will be noted that the tubular member 38 extends from the housing 23 so that it is positioned in radial relation to the longitudinal axis of the solid propellant rocket motor to conserve length as regards the tubular member 38 and also to permit manual adjustment of the safe-arm device from a position outwardly of the airframe 42 after the solid propellant rocket motor has been lodged in the launching installation.

In the position of Safe of the safe-arm device, as shown in FIG. 1, the passageway 26 provides communication between the port 28 in which the igniter or squib 51 is mounted and the tubular member 38, so that if the igniter or squib 51 is accidentally or inadvertently actuated, any gases or flame created by such actuation, will be dispersed into the atmosphere through the tubular member 38.

Thus ignition of the solid propellant grain in the solid propellant rocket motor will be prevented.

In the arm position as shown in FIG. 3, the passageway 27 is in communication with the port 28 and the bore 24 of the boss 22 which is in direct communication with the interior of the rocket motor case so that as the igniter or squib 51 is command actuated, any gases and flame created by the igniter or squib 51 will ignite a pyrotechnic material within the rocket motor which will subsequently ignite the solid propellant grain in the rocket motor case.

In the safe position, as in FIG. 1, the rod 49 will coincide with the safe mark or cavity 52 and in the arm position the rod 49 will coincide with the arm mark or cavity 53, both of the marks or cavities being located in or on the outer surface of the airframe 42, as shown in FIG. 5.

It being understood that the safe and arm positions of the safe-arm device are achieved by manual operation of the safe-arm device through the medium of the rod 49 by any one standing outside of the airframe 42.

Figure 8:
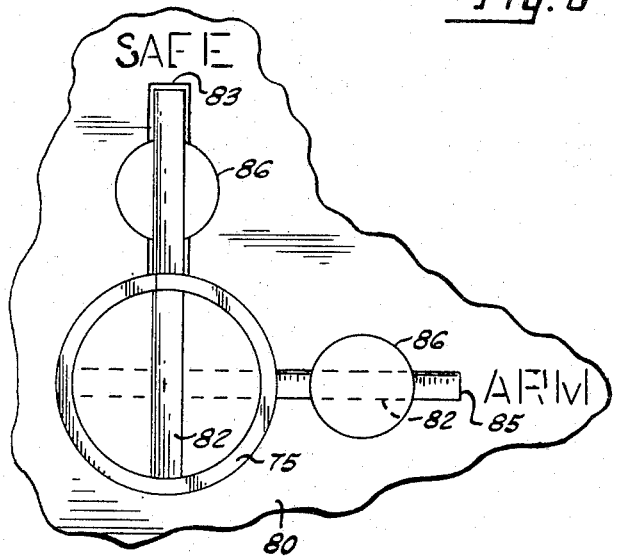
FIG. 8 is an enlarged fragmentary elevational view taken on the line 8—8 of FIG. 6 and showing a portion of the air frame for a solid propellant rocket motor.
Figure 7:
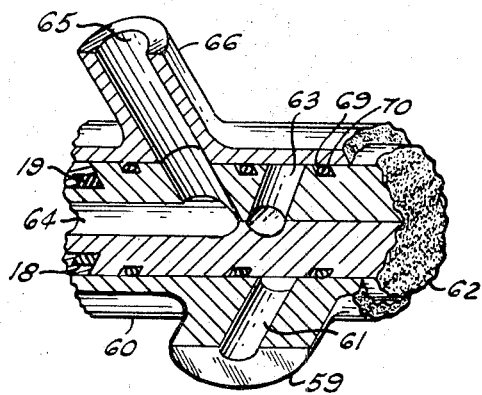
FIG. 7 is a detailed fragmentary sectional view of the form of the invention shown in FIG. 6 in safe position.

In the form of the invention shown in FIGS. 6 to 8 inclusive, the reference numeral 54 is used to designate the domed head end of a rocket motor case 55, for a solid propellant rocket motor, in which there is positioned a solid propellant grain 56. In this instance the flanged opening 57 for the head end 54, is shown as having a smooth bore 58 to receive a cylindrical boss 59 which is integral with and extends at right angles from a circular housing 60 and is provided with a bore 61, it being understood that the opening 57 may be internally threaded as in FIG. 1 and the boss 59 may also be externally threaded as in FIG. 1.

Mounted for rotational movement within the housing 60 is a circular plug 62 that is provided with passageways 63 and 64 respectively, that are adapted to alternately register with a port 65 formed in a tubular extension 66 that is integral with and extends at right angles from the housing 60.

The housing 60 is provided with an internally threaded open end 67 which is of a size to receive the plug 62 and a retainer nut 68 is adapted to be threaded into the internally threaded open end 67 of the housing 60.

The circumferential surface of the plug 62 is provided with a plurality of annular grooves 69 in which are received O-rings 70 which seal the plug 62 within the housing 60. The circumferential surface of the plug 62 is also provided with an annular groove 71 and the housing 62 is provided with an annular groove 72 that is in alinement with the groove 71 so that a split bearing ring 73 may be positioned in the alined grooves 71 and 72. In FIG. 6, it will be noted that the grooves 69 with the O-rings 70 therein, that are positioned on the opposite sides of the port 65, seals the port 65 with relation to the plug 62 as the groove 35 and O-ring 36 seals the port 28, as shown in FIG. 1, and the gasket 18, in the annular recess 19 seals the retainer nut 68.

That portion of the plug 62 that is of a reduced diameter to be received in the nut 68, forms a socket 74 that extends outwardly of the housing 60 through the nut 68 and one end of a tubular member 75 is retained in the socket 74 by means of a pin 76 that is inserted into the tubular member 75 and extends therefrom at right angles thereto into a slot 77 that is formed in the socket 74 adjacent the outer end thereof.

The opposite end of the tubular member 75 extends into an opening 78 that is formed in a backup or reinforcing plate 79 and the plate 79 is in turn secured to the airframe 80 of the solid propellant rocket motor by fastening means 81.

The outer end of the tubular member 75 extends through the backup or reinforcing plate 79 so that it is flush with the outer surface of the airframe 80 and a rectangular-shaped rod 82 extends through alined openings 83 in the outer end of the tubular member 75 at right angles to the longitudinal axis of the tubular member 75.

In the operation of this form of the invention, a conventional igniter or squib, not shown, is inserted into the outer end of the extension 66 into the port 65 after the housing 60 has been secured to the head end 54 of the solid propellant rocket motor case 55, as previously described.

It will be noted that the tubular member 75 also extends from the housing 60 so that it is positioned in radial relation to the longitudinal axis of the solid propellant rocket motor to conserve length as regards the tubular member 75 and also to permit manual adjustment of the safe-arm device from a position outwardly of the airframe 80 after the solid propellant rocket motor has been lodged in the launching installation.

In the position of safe of the safe-arm device, as shown in FIG. 7, the passageway 64 provides communication between the port 65 in which the igniter or squib will be mounted and the tubular member 75 so that if the igniter or squib is accidently or inadvertently actuated, any gases or flames created by such actuation will be dispersed into the atmosphere outwardly of the airframe 80 through the tubular member 75. Thus ignition of the solid propellant grain 56 in the solid propellant rocket motor case 55 will be prevented.

In the arm position shown in FIG. 6, the passageway 63 is in communication with the port 65 and the bore 61 of the boss 59 which is in direct communication with the interior of the rocket motor case 55 so that as the igniter or squib is command actuated, any gases and flame created by the igniter or squib will ignite a pyrotechnic material within the rocket motor case 55, which will subsequently ignite the solid propellant grain 56 in the rocket motor case 55.

In the safe position as in FIG. 8, the rod 82 will coincide with the safe mark or cavity 84 and in the arm position the rod 82 will coincide with the arm mark or cavity 85, both of the marks or cavities being located in or on the outer surface of the airframe 80 and finger openings 86 are provided in the airframe 80 for easy manipulation of the rod 82, as shown in FIG. 8. It also being understood that the safe and arm positions of the safe-arm device are achieved by manual operation of the safe-arm device through the medium of the rod 82 by any one standing outside of the airframe 80.

In the form of the invention shown in FIGS. 9 to 12 inclusive, the reference numeral 87 is used to designate the dotted line representation of the domed head end of a rocket motor case for a solid propellant rocket motor, in which there is positioned a solid propellant grain. In this instance, the head end 87 has an internally threaded central flanged opening 88 into which is threaded an externally threaded boss 89 which is integral with and extends at right angles from a rectangular-shaped open ended housing 90 and is provided with a bore, not shown.

Mounted for reciprocal movement within the housing 90 is a cylindrical plug 91 that is provided with a circular cavity 92 that extends at right angles to the longitudinal axis of the plug 91 and has a passageway 93 extending therefrom at right angles thereto that is also at right angles to the longitudinal axis of the plug 91 and the cavity 92 is adapted to alternately register with an alined port 94 in the housing 90, and a circular cavity 95 that is also at right angles to the longitudinal axis of the plug 91 and has a seat 96 at the outer end thereof and the cavity 95 and seat 96 are also adapted to alternately register with the port 94. The cavity 95, however, has direct communication with a longitudinally extending cavity 97 in the plug 91. The cavity 97 is in turn in communication with an alined tubular member 98 that is secured in an enlarged recess 99 that is positioned in the outer end of the cavity 97 in the plug 91 and the tubular member 98 extends outwardly of the housing 90 through one open end thereof and is coincident with the longitudinal axis of the plug 91.

There is provided in the plug 91, slightly inwardly of the inner end of the tubular member 98, an annular seat or groove 100 and a spring biased ball 101 is adapted to alternately be received in the seat 96 and the seat or groove 100, as will be later described.

The ball 101 is located in a circular cavity 102 that is provided in the housing 90 in parallel spaced relation to the passageway 94 and also extends at right angles to the longitudinal axis of the housing 90.

A keeper 103 contoured to the spherial shape of the ball 101, engages the ball 101 under tension of a spring 104 that is also in the cavity 102 and the spring 104 is tensioned by a screw bolt 105 that is threaded into the outer open end of the cavity 102.

An angularly disposed passageway 106 in the housing 90 provides direct communication between the port 94 and the circular cavity 102 for a purpose to be later described.

Circular grooves 107 are provided in the plug 91 adjacent the outer ends thereof and O-rings 108 received in the grooves 107 seal the plug 91 within the housing 90.

The tubular member 98, as previously described, extends outwardly of the housing 90 to have the outer end thereof received in a keeper 109 that is secured to the inner surface of an airframe 110 for the solid propellant rocket motor. The keeper 109 is alined with an opening 111 in the airframe 110 and a large headed plug 112 that is positioned in the keeper 109 so that it is flush with the outer surface of the airframe 110 and is visible through the opening 111 in the airframe 110 and carries on the outer face thereof the word SAFE, as shown in FIG. 12. The plug 112 is tethered to the outer end of the tubular member 98 by a cable 113 that is secured at one end by a loop 114 which encircles a dowel or pin 115 that is mounted in and extends transversely of the tubular member 98 at right angles to the longitudinal axis thereof adjacent to the outer end of the tubular member 98. The opposite end of the cable 113 is received in an apertured stud 116 that is retained in the plug 112 by a dowel or pin 117.

In the operation of this form of the invention, a conventional igniter or squib 118 is threaded into the outer end of the port 94 after the housing 90 has been secured to the head end 87 of the rocket motor case by means of the boss 89, as previously described.

It will also be noted that the tubular member 98 extends from the housing 90 so that it is positioned in radial relation to the longitudial axis of the solid propellant rocket motor to conserve length as regards the tubular member 98 and to permit manual adjustment of the safe-arm device from a position outwardly of the airframe 110 after the solid propellant rocket motor has been lodged in the launching installation.

In the position of safe of the safe-arm device, as shown in FIG. 10, the cavity 95 provides communication between the port 94 in which the igniter or squib 118 is mounted and the cavity 97 in the plug 91 and the tubular member 98 that is secured in the plug 91 in alinement with the cavity 97 so that if the igniter or squib 118 is accidently or inadvertently actuated, any gases or flames created by such actuation will pass through the tubular member 98, blow the plug 112 outwardly of the keeper 109 and vent to the atmosphere. Thus such gases or flames will not enter the combustion chamber in the solid propellant rocket motor in which the solid propellant grain is postiioned. Thus, ignition of the solid propellant grain in the solid propellant rocket motor will be prevented. Also such gases will pass through the passageway 106 to enter into the cavity 102 and assist the spring 104 in exerting force on the ball 101 to more firmly seat the ball 101 in the seat or groove 100 to assist in preventing any reciprocal movement of the plug 91 so that the cavity 95 is maintained during the passage of such gases or flames to the atmosphere in full alignment with the port 94.

In the arm position as shown in FIG. 11, the plug 91 has been moved longitudinally of the housing 90 by pulling outwardly on the plug 112 and in this position the cavity 92 will be in communication with the port 94 and the passageway 93 will be alined with and in communication with the bore in the threaded boss 89. It being understood that the bore of the boss 89 is in direct communication with the interior of the rocket motor case so that as the igniter or squibb 118 is command actuated, any gases and flame created by the igniter or squib 118 will ignite a pyrotechnic material within the rocket motor case which will subsequently ignite the solid propellant grain in the rocket motor case. As in the safe position, gases created by the actuation of the igniter or squib 118 will pass through the passageway 106 to enter the cavity 102 and assist the spring 104 in exerting force on the ball 101 to more firmly seat the ball 101, in this instance, in the seat 96 of the cavity 95 to assist in preventing any reciprocal movement of the plug 91 so that the cavity 92 is maintained in full alinement with the port 94.

In view of the fact that the housing 90 is open ended, some means must be provided for preventing the plug 91 from being moved entirely out of the housing 90 and limiting movement of the plug 91 is accomplished by means of an elongated longitudinal slot 119 which is formed in the plug 91 and receives a set screw 120 which enters the housing 90 at right angles to the longitudinal axis of the housing 90 so that it is in positive alinement with the slot 119, thus movement of the plug 91 is limited by the engagement of the set screw 120 with the outer ends of the slot 119, as shown in FIGS. 10 and 11.

In the safe position as in FIG. 10, the plug 112 will be in position in the keeper 109, as shown in FIG. 10 so that the word SAFE on the plug 112 will be visible to one standing on the outside of the airframe 110. There is no arm position visible in this form of the invention, but the fact that the plug 112 is no longer in the keeper 109, and the outer end of the tubular member 98 is visible, as shown in FIG. 11, will clearly indicate to any one that the safe-arm device is in arm position.

It is also to be understood that the manipulation of the plug 112 will indicate the safe and arm positions of the safe-arm device and that such manipulation of the plug 112 will be achieved by any one standing outside of the airframe 110.

Basically all forms of the invention are the same, regardless of whether the plug is mounted for rotary or reciprocal movement. The plugs are provided with passageways that are positioned to either arm, the safe-arm device or make it safe and thus there has been provided safe-arm devices that are simple, inexpensive and are susceptible of manual operation eliminating any type of mechanism that would be required to operate the safe-arm devices.

There has thus been illustrated and described three different forms of safe-arm devices that are efficient and operate in a similar manner to prevent accidental or inadvertent ignition of a solid propellant grain in a solid propellant rocket motor.

It is believed that the construction and mode of operation of the invention will be clear to one skilled in the art from the foregoing description and further that variations in such construction and mode of operation may be adhered to provided such variations fall within the spirit of the invention.

Having thus described the invention what is claimed as new and desired to be secured by Letters Patent is:

1. A safe-arm device for a solid propellant rocket motor including a rocket motor case having a head end thereon and a combustion chamber therein in which is positioned a solid propellant grain, comprising a housing rigidly connected to the head end of said rocket motor case, a plug movable in said housing, said plug having one or more passageways therein, said housing having a port therein that is in communication with said combustion chamber, an igniter mounted in said port and whereby the movement of said plug to aline one of the passageways therein with said port will permit the ignition of said solid propellant grain and the misalinement of said one of the passageways and said port by further movement of said plug will prevent accidental or inadvertent ignition of said solid propellant grain.

2. A safe-arm device as in claim 1, wherein the movement of said plug is rotary as compared to the longitudinal axis of said housing.

3. A safe-arm device as in claim 1, wherein the movement of said plug is reciprocal as compared to the longitudinal axis of said housing.

4. A safe-arm device as in claim 1, wherein there is connected to said plug a tubular member that will be in communication with one of the passageways in said plug when said plug has been moved to prevent accidental or inadvertent ignition of said solid propellant grain.

5. A safe-arm device as in claim 4, wherein means are provided that coact with said tubular member to indicate the position of said plug in relation to said housing.

6. A safe-arm device as in claim 4, wherein said tubular member extends from said housing in radial relation to the longitudinal axis of said housing and said rocket motor case.

References Cited
UNITED STATES PATENTS

| | | |
|---|---|---|
| 39,812 | 9/1863 | Hayman. |
| 692,170 | 1/1902 | Wallerstein et al. __ 137—625.47 |
| 3,111,810 | 11/1963 | Branman et al. |
| 3,423,931 | 1/1969 | Schwarz et al. |

CARLTON R. CROYLE, Primary Examiner

A. D. HERRMANN, Assistant Examiner

U.S. Cl. X.R.

60—39.82, 256; 102—70